United States Patent
Park et al.

(10) Patent No.: US 7,885,232 B2
(45) Date of Patent: Feb. 8, 2011

(54) MOBILE COMMUNICATION TERMINAL, METHOD OF OPERATING THE SAME IN HANDOVER REJECTION AND METHOD OF REJECTING HANDOVER IN PORTABLE INTERNET SYSTEM

(75) Inventors: Seong Jin Park, Anyang-si (KR); Sung Hun Hong, Seoul (KR); Ki Taek Song, Seoul (KR)

(73) Assignee: LG Electronics Inc., Seoul (KR)

( * ) Notice: Subject to any disclaimer, the term of this patent is extended or adjusted under 35 U.S.C. 154(b) by 771 days.

(21) Appl. No.: 11/704,190

(22) Filed: Feb. 9, 2007

(65) Prior Publication Data

US 2008/0026760 A1    Jan. 31, 2008

(30) Foreign Application Priority Data

Jul. 27, 2006    (KR) .................... 10-2006-0070648

(51) Int. Cl.
   *H04W 4/00*    (2009.01)
(52) U.S. Cl. ......................... 370/331; 370/329
(58) Field of Classification Search ............... 455/436, 455/437, 438, 439, 440, 442, 444; 370/331, 370/332
   See application file for complete search history.

(56) References Cited

U.S. PATENT DOCUMENTS

| | | | |
|---|---|---|---|
| 6,775,253 B1 * | 8/2004 | Agrawal et al. ............. | 370/329 |
| 2005/0153743 A1 * | 7/2005 | Berra et al. .................. | 455/560 |
| 2005/0181794 A1 | 8/2005 | Rajkotia | |
| 2006/0135173 A1 * | 6/2006 | Vannithamby ............... | 455/453 |
| 2007/0015510 A1 * | 1/2007 | Xiang ......................... | 455/436 |
| 2007/0025297 A1 * | 2/2007 | Lee et al. ..................... | 370/331 |
| 2008/0056195 A1 * | 3/2008 | Lee et al. ..................... | 370/331 |

FOREIGN PATENT DOCUMENTS

EP        1 534 035 A1    5/2005

* cited by examiner

*Primary Examiner*—George Eng
*Assistant Examiner*—Michael Faragalla
(74) *Attorney, Agent, or Firm*—Birch, Stewart, Kolasch & Birch, LLP

(57) ABSTRACT

A method of operating a mobile communication terminal for a handover rejection in a portable Internet system and the mobile communication terminal using the same are disclosed. The method includes transmitting a handover request message to a serving base station and receiving a response message corresponding to the handover request message from the serving base station, in which the handover request message requests a handover operation to at least one target base station. The method also includes checking whether the received response message includes contents regarding the handover rejection, extracting at least one of terminal action instruction information and rejection reason information corresponding to the handover rejection from the response message according to a result of the checking step, and executing an action according to the extracted information.

4 Claims, 8 Drawing Sheets

FIG. 5A

| Syntax | Size(bits) | Notes |
|---|---|---|
| MOB_MSHO-REQ_Message_format() { | | |
| Management Message Type=57 | 8 | |
| Report metric | 8 | Bitmap indicating presence of metric in message<br>Bit 0:BS CINR mean<br>Bit 1:BS RSSI mean<br>bit 2:Relative delay<br>Bit 3:BS RTD; this metric shall be only measured on serving BS/anchor BS.<br>Bit 4-7:reserved; shall be set to zero |
| N_New_BS_Index | 8 | Number of new recommended BSs which are included in MOB_NBR-ADV message |
| If(N_New_BS_Index!=0) { | | |
| Configuration change count for MOB_NBR-ADV | 8 | Configuration Change Count value of refer-ring MOB_NBR-ADV message |
| } | | |
| For(j=0;j<N_NEW_BS_Index;j++) { | | |
| Neighbor_BS_Index | 8 | |
| Preamble index/Preamble Present & Sub-channel Index | 8 | For the SCa and OFDMA PHY this parameter defines the PHY specific preamble for the neighbor BS. For the OFDM PHY the 5 LSB contain the active DL subchannel index for the neighbor BS. The 3 MSB shall be Reserved and set to '0b000' |
| If(Report metric[Bit#0]==1) | | |
| BS CINR mean | 8 | |
| If(Report metric[Bit#1]==1) | | |
| BS RSSI mean | 8 | |
| If(Report metric[Bit#2]==1) | | |
| Relative delay | 8 | |
| Service level prediction | 3 | |
| Arrival Time Difference Indication | 1 | If the MS is transmitting this message to request HO or MDHO/FBSS is not supported by either BS or MS, this bit shall be set to 0 |

FIG. 5B

| | | |
|---|---|---|
| If(Arrival Time Difference Indication==1) { | | |
| Arrival Time Difference (t) | 4 | Relative difference in arrival time between the neighbor BS and the anchor BS, in terms of fraction of CP |
| } | | |
| } | | |
| N_New_BS_Full | | |
| For(j=0;j<N_New_BS_Full;j++) { | | |
| Neighbor_BS_ID | 8 | |
| Preamble index/Preamble Present & Sub-channel Index | 8 | For the SCa and OFDMA PHY this parameter defines the PHY specific preamble for the neighbor BS. For the OFDM PHY the 5 LSB contain the active DL subchannel index for the neighbor BS. The 3 MSB shall be Reserved and set to '0b000' |
| If(Report metric [Bit#0]==1) | | |
| BS CINR mean | 8 | |
| If(Report metric[Bit#1]==1) | | |
| BS RSSI mean | 8 | |
| If(Report metric[Bit#2]==1) | | |
| Relative delay | 8 | |
| Service level prediction | 3 | |
| Arrival Time Difference Indication | 1 | If the MS if transmitting this message to request HO or MDHO/FBSS is not supported by either BS or MS, this bit shall be set to 0 |
| If(Arrival Time Difference Indication==1) { | | |
| Arrival Time Difference (t) | 4 | Relative difference in arrival time between the neighbor BS and the anchor BS, in terms of fraction of CP |
| } | | |
| } | | |

FIG. 6

| Syntax | Size(bits) | Notes |
|---|---|---|
| MOB-BSHO-RSP_message_format() { | | |
| Management message Type=58 | 8 | |
| Mode | 3 | 0b000:HO request<br>0b001:MDHO/FBSS request:Anchor BS update with CID update<br>0b010:MDHO/FBSS request:Anchor BS update without CID update<br>0b011:MDHO/FBSS request:Diversity Set update with CID update<br>0b100:MDHO/FBSS request:Diversity Set update without CID update<br>0b101:MDHO/FBSS request:Diversity Set update with CID update for newly added BS<br>0b110:MDHO/FBSS request:Diversity Set update with CID update and CQICH allocation for newly added BS<br>0b111:MS handover request not recommended(BS in list unavailable) |
| Reserved | 5 | 0b00000:Case excluding that mode filed is set to 0b111<br>0b00001:Retransmission instruction<br>0b00010:Rescan instruction by including former target BS<br>0b00011:Rescan instruction by excluding former target BS<br>0b00100:Handover instruction into random target BS<br>0b00101:Communication maintain instruction with serving BS<br>0b00110:Capacity excess of target BS<br>0b00111:Impossible communication between serving BS and target BS<br>0b01000:Capacity excess of all BS due to overload on entire network<br>0b01001~0b11111:Reserved |

MOBILE COMMUNICATION TERMINAL, METHOD OF OPERATING THE SAME IN HANDOVER REJECTION AND METHOD OF REJECTING HANDOVER IN PORTABLE INTERNET SYSTEM

This application claims the benefit of the Korean Patent Application No. 10-2006-0070648, filed on Jul. 27, 2006, which is hereby incorporated by reference in its entirety.

BACKGROUND OF THE INVENTION

1. Field of the Invention

The present invention relates to a mobile communication terminal and corresponding method in which information is provided to the mobile terminal when a handoff request is rejected.

2. Discussion of the Related Art

Generally, a mobile terminal enables a large amount of data to be exchanged with a base station at high speed via a portable Internet. Communication specifications for the portable Internet include World Interoperability for Microwave Access (hereinafter abbreviated WiMAX), Wireless Broadband (hereinafter abbreviated WiBro), etc.

WiMAX is a technical specification developed by providers in the WiMAX Forum. Further, WiMAX compensates the wireless LAN technology by considerably extending the Internet-available range outside of buildings. WiBro is a wireless portable Internet solution developed by the Ministry of Information and Communication Republic of Korea, the Telecommunication Technology Association (TTA) and mobile communication providers. WiBro provides an ultra-high-speed Internet service for portable terminals.

Therefore, using the portable Internet service, a portable device such as a handset, a laptop, a personal portable information terminal, a PDA (personal digital assistant), a smart phone, etc. can access the Internet. In addition, to stably exchange data with a prescribed base station via the portable Internet, the mobile communication terminal frequently scans neighboring base stations and performs a handover process via a specific one of the neighboring base stations according to a corresponding scanning result.

For instance, if a received signal strength of a serving base station currently transmitting/receiving data falls below a predetermined value, or if it is necessary for the mobile terminal to move into a neighboring base station providing a higher received signal strength, the mobile terminal decides to perform the handover process and executes a handover negotiation procedure with the serving base station.

In more detail, a handover procedure according to a related art will now be explained with reference to FIG. 7. As shown in FIG. 7, a mobile communication terminal 710 first transmits a handover request message requesting a handover to another base station to the serving base station 720 (S740) The message includes information about a target base station 730.

The serving base station 720 then transmits a handover response message in response to the handover request message to the mobile terminal 710 (S750). The handover response message may be an instruction message that allows the handover request or may be a rejection message that rejects the handover request. Further, the handover response message includes information about a target base station recommended by the serving base station 720.

When the handover response message is the instructing message for instructing the handover, the mobile terminal 710 transmits a handover confirmation message indicating information about a final target base station to the serving base station 720 (S760). Subsequently, the mobile terminal 710 executes the handover process to the final target base station 730 (S770).

However, when the handover response message is a rejection message rejecting the handover request, the mobile terminal 710 arbitrarily decides what next action to take corresponding to the handover rejection and then performs the decided action. Thus, the related art handover method has the following problems or disadvantages.

Firstly, when the handover request is rejected, the mobile terminal arbitrarily decides the next action to take. That is, the terminal does not consider a current network status, but rather arbitrarily decides what next action to perform. Therefore, the mobile communication terminal does not perform an optimal action suitable for a network environment to correspond to the handover rejection.

Secondly, because the mobile terminal is unable to determine a reason for the handover rejection in association with a network environment, the terminal performs a next action for the handover rejection regardless of the current network environment. Thirdly, when the handover request is rejected, the terminal only receives the rejection instruction message, but does not receive any detailed information about the handover rejection.

SUMMARY OF THE INVENTION

Accordingly, one object of the present invention is to address the above-noted and other objects.

Another object of the present invention is to provide a mobile terminal with terminal action instructing information or rejection reason information associated with a handover rejection.

Yet another object of the present invention is to provide a mobile terminal with an optimal action considering a current network environment in response to a handover rejection.

Still another object of the present invention is to provide a mobile terminal with the capability to consider a detailed reason for the handover rejection so the terminal can perform an optimal action corresponding to a handover rejection.

To achieve these objects and other advantages and in accordance with the purpose of the invention, as embodied and broadly described herein, the present invention provide in one aspect a method of operating a mobile communication terminal for a handover rejection in a portable Internet system. The method includes transmitting a handover request message to a serving base station and receiving a response message corresponding to the handover request message from the serving base station, in which the handover request message requests a handover operation to at least one target base station. The method also includes checking whether the received response message includes contents regarding the handover rejection, extracting at least one of terminal action instruction information and rejection reason information corresponding to the handover rejection from the response message according to a result of the checking step, and executing an action according to the extracted information.

In another aspect, the present invention provides a mobile communication terminal including a transceiver configured to transmit a handover request message to a serving base station and to receive a response message corresponding to the transmitted handover request message from the serving base station, an information extracting unit configured to check whether the received response message includes contents regarding the handover rejection, and to extract at least one of terminal action instruction information and rejection reason information corresponding to the handover rejection from the response message according to a result of the checking, and a control unit configured to output a control signal to execute an action according to the extracted information.

In still another aspect, the present invention provides a method of rejecting a handover in a portable Internet system including receiving a handover request message from a mobile communication terminal, in which the handover request message requests a handover to a target base station, deciding whether or not the handover to the target base station is possible, if the handover to the target base station is not possible and is to be rejected, generating a response message, which includes at least one of terminal action instruction information indicating an action to be taken by the mobile terminal and rejection reason information including at least one reason why the handover is rejected, and transmitting the generated response message to the mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5A is a diagram illustrating a first half structure of a handover request message according to one embodiment of the present invention;

FIG. 5B is a diagram illustrating a second half structure of a handover request message according to one embodiment of the present invention;

FIG. 6 is a diagram of a response message corresponding to a handover request message according to one embodiment of the present invention.

DETAILED DESCRIPTION OF THE INVENTION

Reference will now be made in detail to the preferred embodiments of the present invention, examples of which are illustrated in the accompanying drawings.

Figure 1:
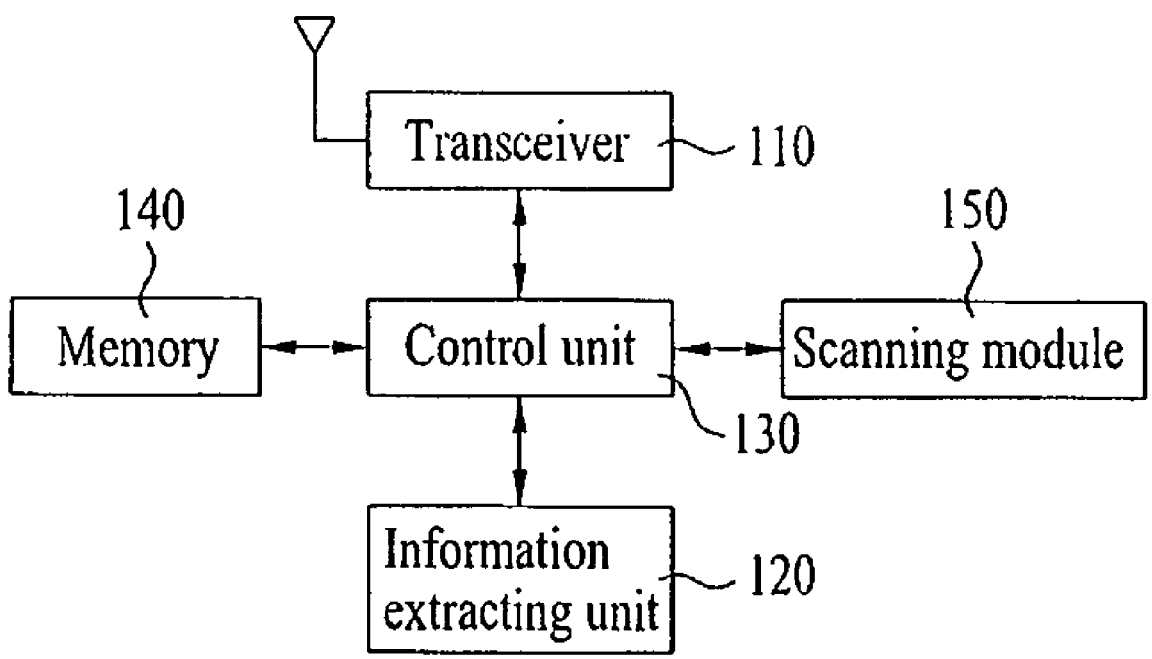
FIG. 1 is a block diagram of a mobile communication terminal according to one embodiment of the present invention.

Turning first to FIG. 1, which is a block diagram of a mobile communication terminal ('terminal') according to one embodiment of the present invention. As shown, the terminal includes a transceiver 110 for transmitting/receiving data and messages to/from a serving base station via the portable Internet, an information extracting unit 120 for extracting prescribed information from a message received via the transceiver 110, a control unit 130 for outputting a control signal commanding an action according to the extracted information, a memory 140 for storing all data and information associated with the terminal, and a scanning module 150 for executing a scanning action according to the control signal from the control unit 130.

Further, the transceiver 110 transmits/receives data or messages to/from the serving base station via the portable Internet. In particular, the transceiver 110 transmits a handover request message to the serving base station via the portable Internet and then receives a corresponding response message from the serving base station.

In one example, the handover request message may be a MOB_MSHO-REQ message and the response message may be a MOB_BSHO-RSP message according to the IEEE (Institute of Electrical and Electronics Engineers) standards. Further, when a received signal strength of the serving base station currently transmitting/receiving data to/from the terminal falls below a prescribed value or the terminal needs to handover to another base station providing a better received signal strength, the transceiver 110 transmits the handover request message to the serving base station.

FIGS. 5A and 5B illustrate an example structure of a handover request message. To simplify the below explanation, only some of the parts of the handover request message will explained. As shown in FIGS. 5A and 5B, the handover request message includes information about neighboring base stations to which one of the target base stations a handover shall be made (i.e., a target base station) and a received signal strength for each of the neighboring base stations.

Further, the target base station is selected based on a received signal strength obtained from scanning the neighboring base stations. The information for the neighboring base stations is obtained from a network management message periodically received from the serving base station. For instance, the network management message may be a MOB_NBR-ADV message according to the IEEE standard.

In addition, the handover request message includes a count of neighboring base stations, which should be taken into consideration in the handover, via an N_New_BS_Index field and an N_New_BS_Full field. The handover request message also includes a mean value of a CINR (Carrier to Interference and Noise Ratio) for a specific neighboring base station via a BS_CINR_mean field.

Further, the handover request message includes a mean value of a RSSI (Received Signal Strength Indication) for a specific neighboring base station via a BS_RSSI_mean field. Namely, the handover request message provides parameters required for the serving base station to decide whether to accept a handover request made by the terminal.

Turning next to FIG. 6, which is a diagram illustrating an example of a response message from the serving base station. Similarly to the above description with respect to the request message shown in FIGS. 5A and 5B, only some parts of the response message will be explained to simplify the below description.

As shown in FIG. 6, the response message includes a mode field having information indicating whether the handover is accepted or rejected and a reserved field having terminal action instruction information or rejection reason information in response to a handover rejection. For instance, if the mode field is set to 0b111, the response message informs the terminal that the handover has been rejected or is not recommended.

Further, when the mode field is set to 0b111, the response message also includes the terminal action instruction information or the rejection reason information in response to the handover rejection according to a value of the reserved field. This is explained in detail as follows.

First, the information extracting unit 120 extracts necessary information from the prescribed data or message. In particular, the information extracting unit 120 determines whether or not the response message includes information indicating the message is a rejection message, for example. If the message is a rejection message, the information extracting unit 120 extracts the terminal action instruction information or the rejection reason information corresponding to the handover rejection from the response message.

For example, assume the response message has the structure shown in FIG. 6. Then, when the extracting unit 120 has confirmed the response message is a rejection message (i.e., the mode field of the response message is set to 0b111), the information extracting unit 120 determines whether or not the contents of instructing the handover rejection is included in the response message.

Then, the information extracting unit 120 extracts the terminal action instruction information or the rejection reason information corresponding to the handover rejection provided via the reserved field of the response message. For instance, and as shown in FIG. 6, if the reserved field is set to 0b00001, the information extracting unit 120 extracts information instructing the terminal to perform a retransmission of the handover request message.

In addition, if the reserved field is set to 0b00010, the information extracting unit 120 extracts information instructing the terminal to rescan neighboring base stations including the target base station set in the former handover request message. If the reserved field is set to 0b00011, the information extracting unit 120 extracts information instructing the terminal to rescan neighbor base stations except the target base station set in the former handover request message.

In addition, if the reserved field is set to 0b00100, the information extracting unit 120 extracts information instructing the terminal to perform a handover into a random target base station. Also, as further shown in FIG. 6, if the reserved field is set to 0b00101, the information extracting unit 120 extracts information instructing the terminal to maintain communication with the serving base station and release the handover request.

In addition, if the reserved filed is set to 0b00110, the information extracting unit 120 extracts information indicating the target base station has exceeded its capacity. If the reserved filed is set to 0b00111, the information extracting unit 120 extracts information indicating it is impossible to communicate between the serving base station and the target base station.

If the reserved filed is set to 0b01000, the information extracting unit 120 extracts information indicating all base stations have exceeded their capacities due to an overload on an entire network. Thus, the information extracting unit 120 extracts the rejection reason information for the handover rejection from the reserved field of the response message.

Further, the control unit 130 controls all operations and functions of the terminal and portable-Internet associated actions. In particular, the control unit 130 outputs a control signal for commanding an action according to the information extracted by the information extracting unit 120.

In more detail, if the extracted information instructs the terminal to perform a retransmission of the handover request message, the control unit 130 outputs a control signal for selecting a neighboring base station except the target base station set in the former handover request message as a target base station with reference to the former scan information and transmits a handover request message in which the selected target base station is set.

Therefore, the scanning module 150 selects a neighboring base station different from the former target base station as a new target base station according to the control signal of the control unit 130 using the scan information stored in the memory 140. In this instance, the scanning module 150 is able to select the new target base station according to a level of the received signal strength.

Further, the transceiver 110 transmits the handover request message in which the target base station selected by the scanning module 150 is set to the serving base station according to the control signal of the control unit 130. In addition, when the extracted information instructs the terminal to rescan neighboring base stations including the target base station set in the former handover request message, the control unit 130 outputs a control signal for instructing the terminal to scan the neighboring base stations including the target base station set in the former handover request message.

Thus, the scanning module 150 scans all of the neighboring base stations including the target base station set in the former handover request message according to the corresponding control signal of the control unit 130. In this instance, the information for the neighboring base stations is provided via the network management message received from the serving base station.

Further, if the extracted information instructs the terminal to rescan neighboring base stations except the target base station set in the former handover request message, the control unit 130 outputs a control signal for instructing the terminal to scan the neighboring base stations except the target base station set in the former handover request message.

Then, the scanning module 150 scans the rest of the neighboring base stations except the target base station set in the former handover request message according to the corresponding control signal of the control unit 130. Further, if the extracted information instructs the terminal perform a handover into a random target base station, the control unit 130 outputs a control signal instructing the terminal to set the random neighboring base station as a target base station and attempt an initial network entry via the set target base station.

The scanning module 150 sets one of the neighboring base stations except the target base station set in the former handover request message as a new target base station with reference to the former scan information or the newly obtained scan information. The terminal then attempts the initial network entry via the set target base station.

Also, if the extracted information instructs the terminal to maintain communication with the serving base station, the control unit 130 outputs a control signal instructing the terminal to give up the handover request into another neighboring base station and maintain the communication with the serving base station continuously. Thus, the transceiver 110 maintains data communication and message exchange actions with the serving base station.

In addition, the rejection reason information (why the request was rejected) may correspond to at least one of a capacity excess of a target base station, impossible communications between the serving base station and the target base station and a capacity excess of all base stations due to an overload on an entire network. The rejection reason information may also include all cases informing the terminal why the handover is rejected according to a status of network or target base station.

Accordingly, the control unit 130 outputs a control signal for deciding an action most suitable for a current network environment or a status of a target base station and instructs the terminal to perform the decided action according to the extracted rejection reason information. Further, the memory 140 stores all data transmitted/received via the terminal and all data and messages transmitted/received to/from the serving base station via portable Internet.

In particular, the memory 140 stores the terminal action instruction information or the rejection reason information extracted from the response message. In addition, the memory 140 stores the scanning result information, and more particularly, a received signal strength for each neighboring base stations according to the scanning result.

Also, the scanning module 150 performs a scanning operation on neighboring base stations according to the control signal of the control unit 130. The scanning module 150 is generally able to perform a scanning action by receiving a separate scanning section allocated by the serving base station.

In particular, the scanning module 150 is able to scan neighboring base stations including the target base station set in the former handover request message or neighboring base stations except the target base station set in the former handover request message according to the control signal of the control unit 130.

An operational method of a mobile communication terminal when a handover rejection is received in a portable Internet system according to an embodiment of the present invention will now be explained in detail with reference to FIG. 2.

Figure 2:
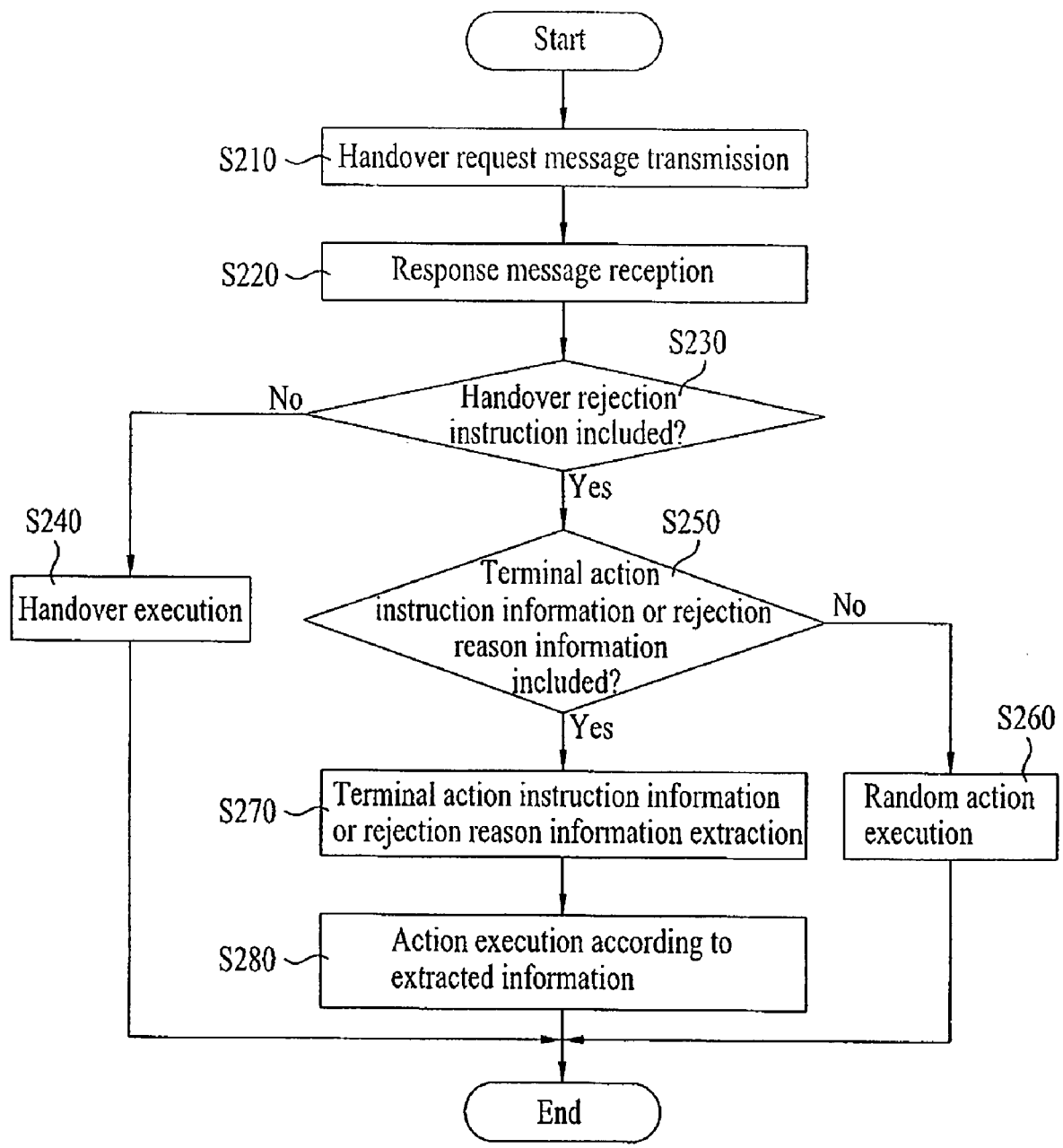
FIG. 2 is a flowchart illustrating a general operational method of a mobile communication terminal in a portable Internet system when a handover rejection occurs according to one embodiment of the present invention.

Referring to FIG. 2, the present invention relates to a mobile communication terminal ('terminal') having a function of transmitting/receiving data to/from a serving base station via the portable Internet. As shown in FIG. 2, the terminal first transmits a handover request message to the serving base station (S210).

That is, when a received signal strength of the serving base station falls below a prescribed value or a neighboring base station provides a better received signal strength, the terminal transmits the handover request message to the serving base station. As discussed above and as shown in FIGS. 5A and 5B, the handover request message includes information about neighboring base stations, to which a handover may be made to one of the neighboring stations, and a received signal strength for each of the neighboring base stations.

In addition, the target base station is selected with reference to the received signal strength obtained from a scanning result for each of the neighboring base stations. Further, as discussed above, the information for the neighboring base stations is obtained from a network management message periodically received from the serving base station.

For instance, the N_New_BS_Index field or N_New_BS_Full field in the handover request message includes a count of neighboring base stations to be taken into consideration for handover. Also, the BS_CINR_mean field includes a mean value of the CINR for a specific neighboring base station, and the BS_RSSI_mean field includes a mean value of the RSSI for a specific neighbor base station. Namely, the handover request message provides the serving base station with information required for deciding whether or not a handover process should be performed.

Next, as shown in FIG. 2, the server base station transmits a response message corresponding to the handover request message to the terminal (S220). FIG. 6 and the description above describe in detail the response message. That is, the response message includes a mode field including information about whether or the handover process is accepted or rejected and a reserved field including information about why the handover process was rejected (if the process was in fact rejected).

In more detail, and as discussed above, if the mode field is set to 0b111, the response message indicates to the terminal that the handover request has been rejected. Further, in this example, the mode field of the response message includes the terminal action instruction information or the rejection reason information in response to the handover rejection according to a value of the reserved field. This will be explained later in more detail with reference to FIG. 3.

Turning back to FIG. 2, after the terminal receives the response message from the serving base station, the terminal checks whether the response message includes information indicating whether the handover request has been rejected (S230). For instance, if the mode field shown in FIG. 6 is set to 0b111, the terminal determines the handover request has been rejected (Yes in S230).

However, if the response message does not include information indicating the handover request has been rejected (No in S230), the terminal executes a next handover procedure according to the response message accepting the handover request (S240). In more detail, the terminal sets up a final target base station using a target base station list set in the response message and a target base station list adopted by the terminal in general. Then, the terminal transmits a handover confirmation message in which the final target base station is set to the serving base station. For example, the handover confirmation message may be a MOB_HO-IND message according to the IEEE standard.

In addition, if the response message indicates the handover request has been rejected (Yes in S230), the terminal determines whether the response message includes the terminal action instruction information or the rejection reason information corresponding to the handover rejection (S250). For instance, if it is confirmed that the reserved field shown in FIG. 6 is set to a prescribed value, it can be determined that the terminal action instruction information or the rejection reason information corresponding to the handover rejection is included in the response message.

If the method determines the terminal action instruction information or the rejection reason information corresponding to the handover rejection is not included in the response message (No in S250), the terminal decides to arbitrarily execute an action corresponding to the handover rejection (S260). That is, because the terminal is not provided with detailed information for the handover rejection by the serving base station, the terminal executes a next action without considering a current network status.

However, if the method determines the terminal action instruction information is included in the response message (Yes in S250), the terminal extracts the terminal action instruction information and/or rejection reason information from the response message (S270). The below description assumes the response message has the structure shown in FIG. 6 and is directed to extracting the terminal action instruction information.

For instance, if the reserved field is set to 0b00001, the terminal extracts information instructing the terminal to perform a retransmission of the handover request message. If the reserved field is set to 0b00010, the terminal extracts information instructing the terminal to rescan neighboring base stations including the target base station set in the former handover request message.

If the reserved field is set to 0b00011, the terminal extracts information instructing the terminal to rescan neighboring base stations except the target base station set in the former handover request message. If the reserved field is set to 0b00100, the terminal extracts information instructing the terminal to perform a handover into a random target base station. Further, if the reserved field is set to 0b00101, the terminal extracts information instructing the terminal to maintain communication with the serving base station.

The below example is directed to the terminal extracting the rejection reason information from the response message and similar to above, assumes the response message shown in FIG. 6.

If the reserved filed is set to 0b00110, the terminal extracts information indicating the target base station has exceeded its capacity. If the reserved filed is set to 0b00111, the terminal extracts information indicating it is impossible to communicate between the serving base station and the target base station. Further, if the reserved filed is set to 0b01000, the terminal extracts information indicating all base stations have exceeded their capacities due to an overload on an entire network.

Subsequently, as shown in FIG. 2, the terminal executes an action according to the extracted information (S280). For example, if the extracted information is the terminal action instruction information, the terminal executes an action as shown in FIG. 3.

In more detail, and as shown in FIG. 6, the terminal action instruction information includes at least one of information instructing the terminal to retransmit a handover request message, information instructing the terminal to rescan neighboring base stations including a former target base station, information instructing the terminal to rescan neighboring base stations except a former target base station, information instructing the terminal to perform a handover process into a random target base station, and information instructing the terminal to maintain a communication with a serving base station.

Figure 3:
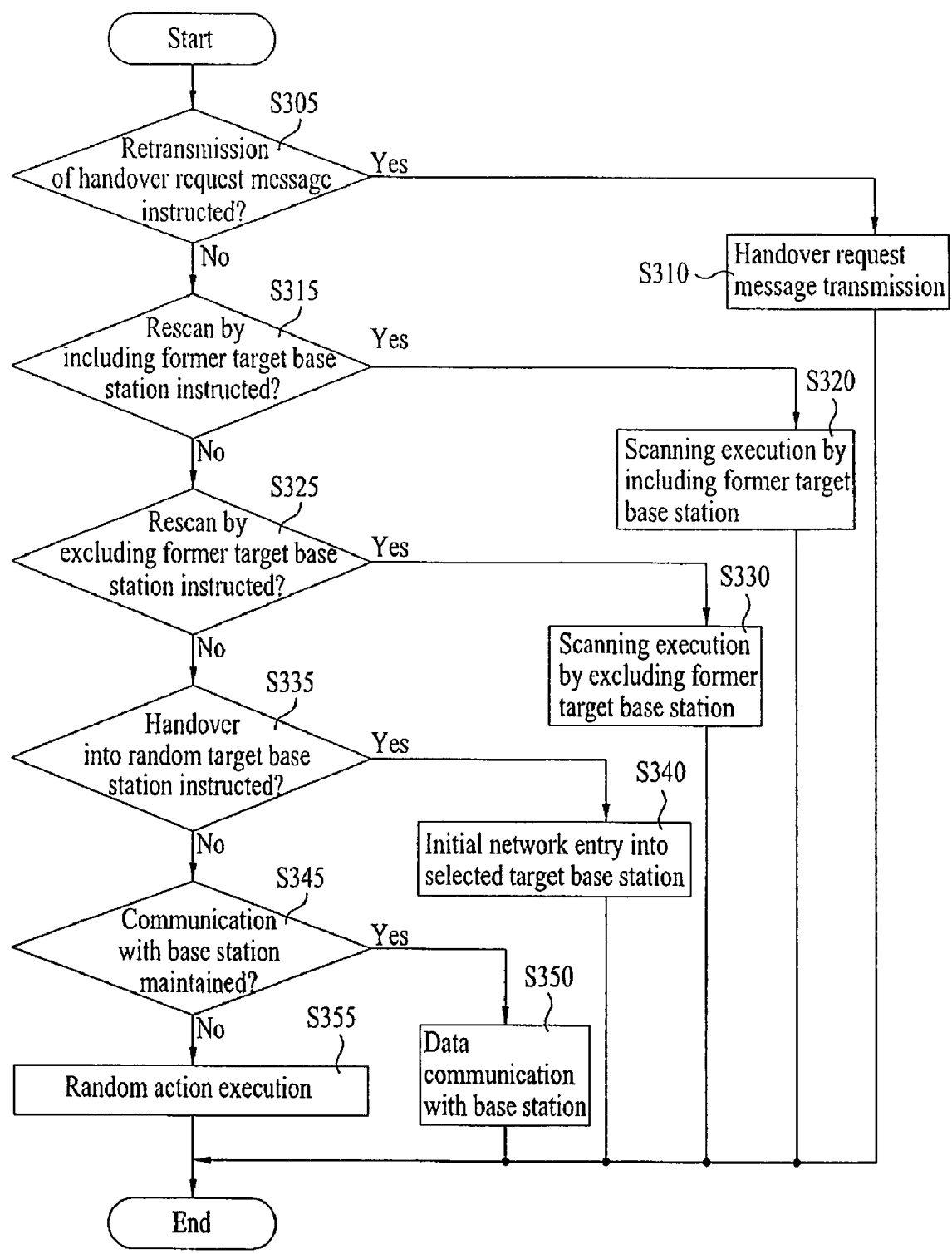
FIG. 3 is a flowchart illustrating a detailed operational method of a mobile communication terminal in a portable Internet system when a handover rejection occurs according to one embodiment of the present invention.

Thus, with reference to FIG. 3, the terminal determines whether the extracted information instructs the terminal to retransmit the handover request message (S305). If the determination is Yes, the terminal transmits a handover request message, in which a target base station is set to another neighboring base station except the target base station set in the former handover request message, to the serving base station (S310). A similar process occurs in steps S315 to S345.

That is, the terminal determines whether the extracted information instructs the terminal to rescan neighboring base stations including the former target base station (S315). If the determination is Yes, the terminal scans all neighboring base stations including the target base station set in the former handover request message (S320). In this instance, the information for the neighboring base stations is provided via a network management message received from the serving base station.

Also, in step S325, the terminal determines whether the extracted information instructs the terminal to rescan the neighboring base stations except the former target base station. If the determination is Yes, the terminal scans the rest of the neighboring base stations except the target base station set in the former handover request message (S330).

In addition, in step S335, the terminal determines whether the extracted information instructs the terminal to perform a handover process into a random target base station. If the determination is Yes, the terminal sets up a new target base station with reference to the former scan information or the newly obtained scan information and then attempts an initial network entry via the set target base station (S340).

Next, in step S345, the terminal determines whether the extracted information instructs the terminal to maintain the communication with the serving base station (S345). If the determination is Yes, the terminal releases the handover request into the other neighboring base station and maintains the communication with the serving base station (S350).

Meanwhile, if the terminal action instruction information is not included in the response message, the terminal arbitrarily decides a next action corresponding to the handover rejection and then executes the decided action (S355).

In addition, as discussed above, the response message may also include information or a reason why the handover request was rejected. That is, the rejection reason information may correspond to at least one of a capacity excess of target base station, impossible communications between the serving and target base stations and a capacity excess of all base stations due to an overload on the entire network. The rejection reason information may also include all situations in which a handover is impossible according to a status of network or target base station.

Therefore, the terminal decides an action most suitable for a current network environment or a status of a target base station and executes the decided action according to the extracted rejection reason information.

Next, a method of rejecting a handover in a portable Internet system according to the present invention will explained in detail with reference to FIG. 4.

Figure 4:
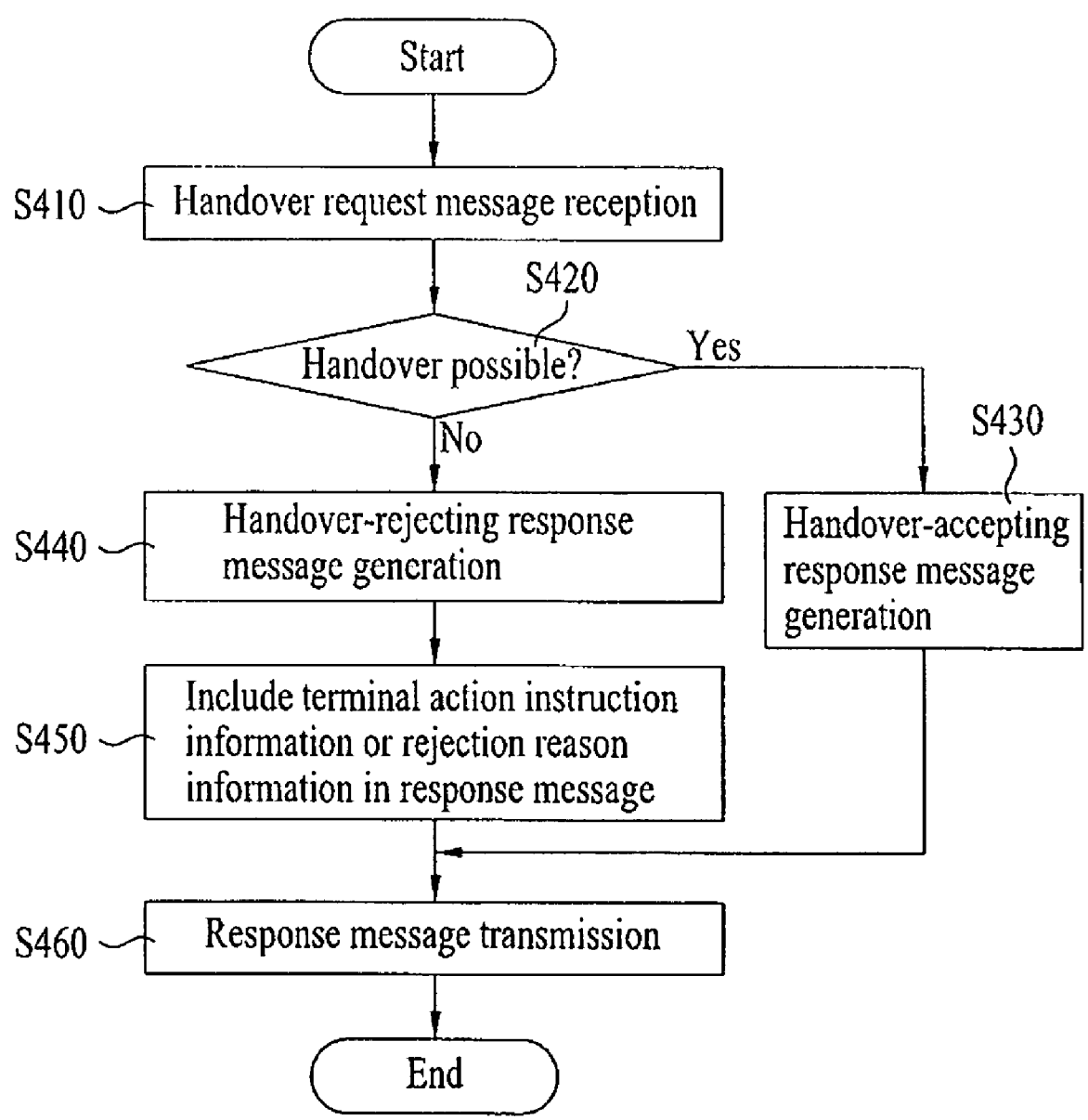
FIG. 4 is a flowchart of a method of rejecting a handover request in a portable Internet system according to one embodiment of the present invention.
Figure 7:
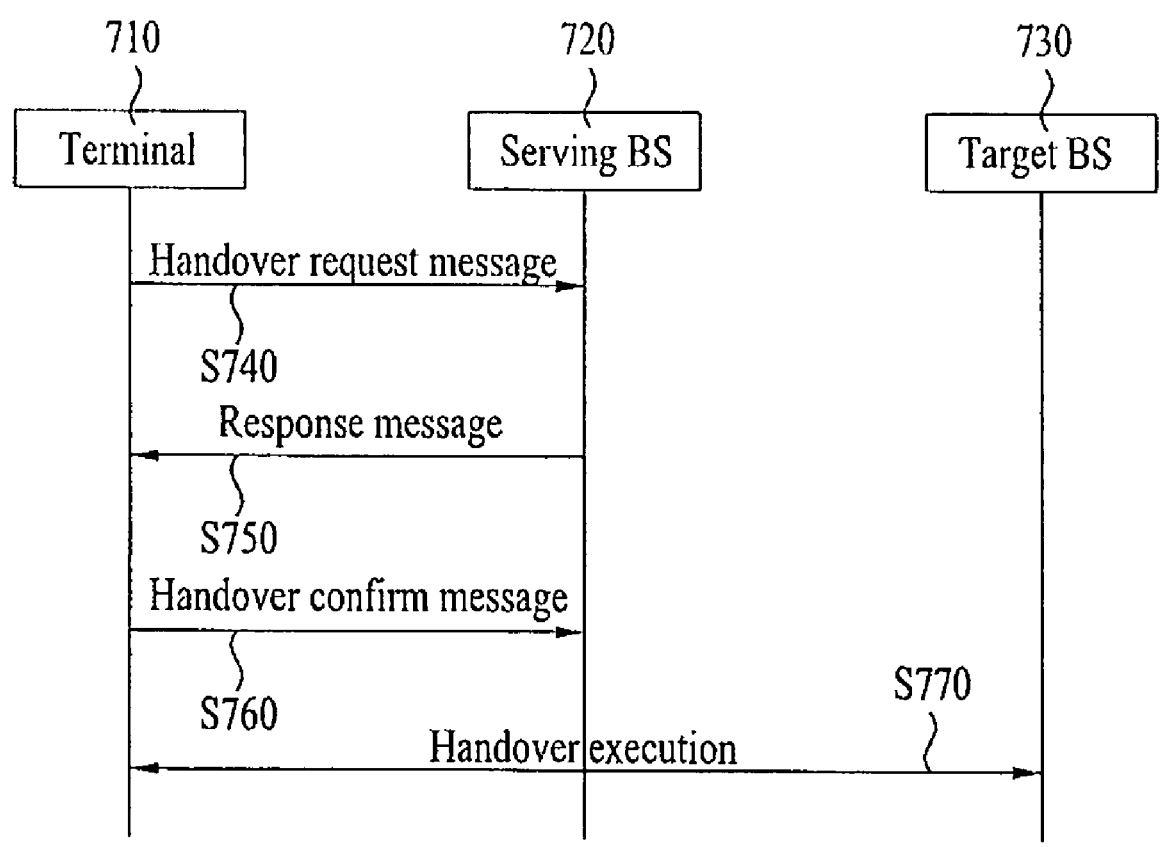
FIG. 7 is a flowchart of a related art handover procedure in a portable Internet system.

As shown in FIG. 4, the portable Internet system receives the handover request message from a mobile communication terminal ('terminal') (S410). As discussed above, the handover request message has the structure shown in FIGS. 5A and 5B. Since the structure of the handover request message has been explained in the foregoing description, its explanation will be omitted in the following description.

Next, the portable Internet system decides a handover possibility of the terminal with reference to a current network environment (S420). In doing so, the portable Internet system is able to use previously stored information or information obtained from a communication with the target base station in deciding the handover possibility.

For instance, the portable Internet system is able to decide the handover possibility with reference to the capacity excess of a target base station, a possibility of a communication between a serving base station and a target base station, an overall capacity excess of an entire network, etc.

In addition, when it is decided the handover is possible (Yes in S420), the portable Internet system transmits a response message to the terminal (S430). In this example, assuming the response message has the structure shown in FIG. 6, the mode field is set to 0b000, and the response message provides the terminal with the information indicating that the handover is accepted.

However, when the handover is impossible (No in S420), the portable Internet system generates a response message for rejecting the handover (S440). In this instance, assuming the response message has the structure shown in FIG. 6, the mode field is set to 0b111, and the response message for rejecting the handover is generated.

Further, terminal action instruction information and/or rejection reason information corresponding to the handover rejection is included in the response message by the portable Internet system (S450). For instance, the terminal action instruction information includes at least one of information instruction the terminal to retransmit a handover request message, information instruction the terminal to rescan neighboring base stations including a former target base station, information instruction the terminal to rescan neighboring base stations except a former target base station, information instruction the terminal to perform a handover process into a random target base station, and information instruction the terminal to maintain a communication with a serving base station.

Further, the rejection reason information may correspond to at least one of a capacity excess of target base station, impossible communications between the serving base station and the target base station and a capacity excess of all base stations due to an overload on entire network. For instance, the terminal action instruction information or the rejection reason information can be included in the response message by the portable Internet system varying a value of the reserved field shown in FIG. 6. Next, the portable Internet system then transmits the response message to the terminal (S460).

Accordingly, the present invention provides the following advantages.

Firstly, when a handover request is rejected, the present invention provides detailed terminal action instruction information or rejection reason information associated with the handover rejection to a mobile communication terminal. Secondly, because an action of a terminal to correspond to a handover rejection is provided in detail, an optimal action can be performed by considering a current network environment.

Thirdly, because a detailed reason for a handover rejection is provided, an optimal action can be performed by considering a current network environment. Finally, terminal action instruction information or rejection reason information corresponding to a handover rejection can be provided to a terminal using a reserved field of a response message.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of operating a mobile communication terminal for a handover rejection in a portable Internet system, said method comprising:
    transmitting a handover request message to a serving base station and receiving a response message corresponding to the handover request message from the serving base station, said handover request message requesting a handover operation to at least one target base station;
    checking whether the received response message includes contents regarding terminal action instruction information;
    extracting the terminal action instruction information from the response message according to a result of the checking step; and
    executing an action according to the extracted terminal action instruction information,
    wherein the terminal action instruction information comprises retransmission instruction of the handover request message, a rescan instruction including the target base station set in the transmitted handover request message, a rescan instruction excluding the target base station set in the transmitted handover request message, a handover instruction into a random target base station and a communication maintain instruction with the serving base station,
    wherein if the terminal action instruction information is the retransmission instruction of the handover request message, the mobile communication terminal transmits a handover request message in which a target base station different from that included in the transmitted handover request message is set with reference to former scan information,
    wherein if the terminal action instruction information is the rescan instruction including the target base station set in the transmitted handover request message, the mobile communication terminal executes a scanning operation by including the target base station,
    wherein if the terminal action instruction information is the rescan instruction excluding the target base station set in the transmitted handover request message, the mobile communication terminal executes a scanning operation by excluding the target base station,
    wherein if the terminal action instruction information is the handover instruction into the random target base station, an initial network entry is executed via a target base station randomly selected by the mobile communication terminal, and
    wherein if the terminal action instruction information is the communication maintain instruction with the serving base station, the mobile communication terminal releases the handover request and maintains a data communication with the serving base station.

2. A mobile communication terminal, comprising:
    a transceiver configured to transmit a handover request message to a serving base station and to receive a response message corresponding to the transmitted handover request message, said handover request message requesting a handover operation to at least one target base station;
    an information extracting unit configured to check whether the received response message includes contents regarding the terminal action instruction information, and to extract the terminal action instruction information from the response message according to a result of the checking; and
    a control unit configured to output a control signal to execute an action according to the extracted terminal action instruction information,
    wherein the terminal action instruction information comprises retransmission instruction of the handover request message, a rescan instruction including the target base station set in the transmitted handover request message, a rescan instruction excluding the target base station set in the transmitted handover request message, a handover instruction into a random target base station and a communication maintain instruction with the serving base station,
    wherein if the terminal action instruction information is the retransmission instruction of the handover request message, the transceiver transmits a handover request message in which a target base station different from that included in the transmitted handover request message is set with reference to a former scanning operation,
    wherein if the terminal action instruction information is the rescan instruction including the target base station set in the transmitted handover request message, the scanning module performs a scanning operation by including the target base station, and
    wherein if the terminal action instruction information is the rescan instruction excluding the target base station set in the transmitted handover request message, the scanning module performs a scanning operation by excluding the target base station, wherein if the terminal action instruction information is the handover instruction into the random target base station, the control unit selects a random target base station and the transceiver transmits a handover request message to the random target base station, and wherein if the terminal action instruction information is a communication maintain instruction with the serving base station, the control unit releases the handover request and maintains a data communication with the serving base station.

3. The mobile communication terminal of claim 2, further comprising a scanning module configured to scan neighboring base stations according to the control signal of the control unit.

4. A method of rejecting a handover in a portable Internet system, said method comprising:

receiving a handover request message from a mobile communication terminal, said handover request message requesting a handover to a target base station;

deciding whether or not the handover to the target base station is possible;

if the handover to the target base station is not possible and is to be rejected, generating a response message, which includes terminal action instruction information indicating an action to be taken by the mobile communication terminal; and transmitting the generated response message to the mobile communication terminal, wherein the terminal action instruction information comprises retransmission instruction of the handover request message, a rescan instruction including the target base station set in the transmitted handover request message, a rescan instruction excluding the target base station set in the transmitted handover request message, a handover instruction into a random target base station and a communication maintain instruction with the serving base station, wherein if the terminal action instruction information is the retransmission instruction of the handover request message, the mobile communication terminal transmits a handover request message in which a target base station different from that included in the transmitted handover request message is set with reference to former scan information, wherein if the terminal action instruction information is the rescan instruction including the target base station set in the transmitted handover request message, the mobile communication terminal executes a scanning operation by including the target base station, wherein if the terminal action instruction information is the rescan instruction excluding the target base station set in the transmitted handover request message, the mobile communication terminal executes a scanning operation by excluding the target base station, wherein if the terminal action instruction information is the handover instruction into the random target base station, an initial network entry is executed via a target base station randomly selected by the mobile communication terminal, and wherein if the terminal action instruction information is the communication maintain instruction with the serving base station, the mobile communication terminal releases the handover request and maintains a data communication with the serving base station.

\* \* \* \* \*